US012247820B2

(12) United States Patent
Hartl

(10) Patent No.: US 12,247,820 B2
(45) Date of Patent: Mar. 11, 2025

(54) CONNECTOR PIN FOR FEEDTHROUGHS AND METHOD FOR PRODUCTION

(71) Applicant: SCHOTT AG, Mainz (DE)

(72) Inventor: Helmut Hartl, Vienna (AT)

(73) Assignee: SCHOTT AG, Mainz (DE)

( * ) Notice: Subject to any disclaimer, the term of this patent is extended or adjusted under 35 U.S.C. 154(b) by 652 days.

(21) Appl. No.: 17/237,428

(22) Filed: Apr. 22, 2021

(65) Prior Publication Data

US 2021/0239443 A1 Aug. 5, 2021

Related U.S. Application Data

(63) Continuation of application No. PCT/EP2019/078366, filed on Oct. 18, 2019.

(30) Foreign Application Priority Data

Oct. 22, 2018 (DE) .................... 10 2018 218 001.6

(51) Int. Cl.

| | |
|---|---|
| ***H01R 12/58*** | (2011.01) |
| ***F42B 3/11*** | (2006.01) |
| ***F42B 3/195*** | (2006.01) |
| ***F42C 19/06*** | (2006.01) |
| ***H01R 12/55*** | (2011.01) |

(52) U.S. Cl.

CPC ................ *F42C 19/06* (2013.01); *F42B 3/11* (2013.01); *F42B 3/195* (2013.01); *H01R 12/55* (2013.01); *H01R 12/58* (2013.01)

(58) Field of Classification Search

CPC .. F42C 19/06; F42B 3/11; F42B 3/195; F42B 3/103; F42B 3/10; H01L 23/49811; H01L 2924/15312; H01R 12/58; H01R 12/55

See application file for complete search history.

(56) References Cited

U.S. PATENT DOCUMENTS

| | | | | |
|---|---|---|---|---|
| 1,813,906 A | | 7/1931 | Caron | |
| 3,274,937 A | | 9/1966 | Kyle | |
| 4,090,772 A | * | 5/1978 | Goodman .............. | H01R 13/04 439/686 |

(Continued)

FOREIGN PATENT DOCUMENTS

| | | |
|---|---|---|
| AT | 513238 | 7/2014 |
| DE | 102006056077 | 5/2008 |

(Continued)

OTHER PUBLICATIONS

English translation of International Search Report dated Dec. 2, 2019 for PCT/EP2019/078366, 2 pages.

*Primary Examiner* — Steven T Sawyer

(74) *Attorney, Agent, or Firm* — Ruggiero McAllister & McMahon LLC

(57) ABSTRACT

The disclosure relates to a connector pin, in particular a metal pin, for feedthroughs, in particular glass-metal feedthroughs, with at least one first, elongated portion, as well as at least one adjoining end portion, and the end portion has a rounding with at least radius R. The disclosure is further characterized in that the cone and/or radius R is preferably a cone and/or radius according to a specification and is obtained by means of a material-removing method and/or a non-material-removing method.

17 Claims, 3 Drawing Sheets

(56) References Cited

U.S. PATENT DOCUMENTS

| | | | | |
|---|---|---|---|---|
| 4,907,988 | A * | 3/1990 | Tilse | H01R 12/58 439/84 |
| 4,983,134 | A * | 1/1991 | Baldyrou | H01R 43/16 439/884 |
| 5,083,928 | A * | 1/1992 | Aikens | H01R 43/16 439/82 |
| 5,122,075 | A * | 6/1992 | Kile | H01R 12/58 439/554 |
| 5,345,872 | A | 9/1994 | Takahashi | |
| 6,376,782 | B1 * | 4/2002 | Kimura | H01L 23/49811 257/E23.068 |
| 6,960,729 | B2 * | 11/2005 | Miyamoto | H01R 12/57 29/843 |
| 8,978,557 | B2 | 3/2015 | Hartl | |
| 2004/0130703 | A1 * | 7/2004 | Brown | G02B 6/3882 356/53 |
| 2004/0216631 | A1 | 11/2004 | Fink | |
| 2006/0222881 | A1 | 10/2006 | Fink | |
| 2007/0187934 | A1 | 8/2007 | Fink | |
| 2008/0176415 | A1 * | 7/2008 | Kim | H01L 21/68757 257/E21.333 |
| 2010/0064923 | A1 | 3/2010 | Fink | |
| 2010/0199872 | A1 | 8/2010 | Fink | |
| 2013/0305948 | A1 * | 11/2013 | Hinkofer | F42B 3/124 102/202.7 |
| 2014/0113504 | A1 * | 4/2014 | Moser | H01R 13/03 439/751 |
| 2014/0299368 | A1 * | 10/2014 | Braunger | H01R 12/58 174/126.1 |
| 2017/0365936 | A1 * | 12/2017 | Huber | H01R 12/585 |
| 2019/0109071 | A1 | 4/2019 | Hartl | |
| 2020/0028287 | A1 * | 1/2020 | Bogursky | H01R 43/16 |

FOREIGN PATENT DOCUMENTS

| | | |
|---|---|---|
| DE | 102012009765 | 11/2013 |
| DE | 102017123278 | 4/2019 |
| EP | 1455160 | 9/2004 |
| EP | 1491848 | 12/2004 |
| EP | 1710532 | 10/2006 |

* cited by examiner

CONNECTOR PIN FOR FEEDTHROUGHS AND METHOD FOR PRODUCTION

CROSS-REFERENCE TO RELATED APPLICATIONS

The present application is a continuation of International Patent Application No. PCT/EP2019/078366, filed on Oct. 18, 2019, which in turn claims the benefit of German Patent Application No. DE 10 2018 218 001.6, filed on Oct. 22, 2018, each of which is herein incorporated by reference.

BACKGROUND OF THE DISCLOSURE

1. Field of the Disclosure

The present disclosure relates to a connector pin, in particular a metal pin, preferably for a feedthrough, in particular a metal-sealing material feedthrough. The connector pin can be for devices that are subjected to high pressures, preferably igniters of airbags or seat belt tensioners. The present disclosure also provides a feedthrough with a connector pin of the present disclosure, and a method for producing the connector pin.

2. Discussion of the Related Art

Connector pins for feedthroughs, in particular metal-sealing material feedthroughs, are already known in various designs from the prior art.

Metal-sealing material feedthroughs are understood to mean vacuum-tight fusions of sealing materials, in particular made of glasses, glass ceramics, or plastics in metals. The metals function here as electric conductors. Feedthroughs of this kind are in widespread use in electronics and in electrical engineering. The material used for fusion, in particular glass, serves here as an insulator. Typical metal-sealing material feedthroughs are constructed in such a way that internal metallic conductors are fused into a preformed sintered glass part, with the sintered glass part or the glass tube being fused into an outer metal part with the so-called base body, which is formed from a ring-shaped or plate-shaped element. Some applications of metal-sealing material feedthroughs of this kind are for ignition devices. The latter are used for, among other things, airbags or seat belt tensioners in motor vehicles. In this case, the metal-sealing material feedthroughs are a component part of an ignition device. The entire ignition device comprises, besides the metal-sealing material feedthrough, an ignition bridge and the explosive agent as well as a metal shrouding, which tightly encloses the ignition mechanism. Either one or two or more than two connector pins, in particular metal pins, can be guided through the feedthrough. In an especially preferred embodiment with a metal pin, the housing is grounded; in a preferred bipolar design, one of the pins is grounded.

Especially in the case of metal-sealing material feedthroughs with two connector pins, in particular metal pins, and a feedthrough that is arranged off-center, the off-center feedthrough opening leads to a weakening of the glazing.

In the prior art, the connector pins, in particular the metal pins for feedthroughs, in particular glass-metal feedthroughs, were furnished with a rounding or fillet, a so-called radius, at least on one end portion. The fillet, in particular the radii of the connector pins, were, as a rule, produced by vibratory grinding. Used as vibratory grinding medium was, for example, $Al_2O_3$ or silicon carbide (SiC) or another grinding agent composed of vibratory grindstones. A drawback of a method of this kind involving the production of a fillet using vibratory grinding agents was that small particles of the vibratory grinding medium were introduced into the surface of the pin. These particles, which, after processing, were deposited in the surface, then led to the fact that, during coating of the surface, such as, for example, nickel coating, defects arose in the coating itself. These defects were then, in turn, the starting points for corrosion, which spread into the region of the socket of the feedthrough—for example, in the case of metal-sealing material feedthroughs. In addition, it was not possible to produce a predefined fillet in a reliable manner.

The object of the disclosure is accordingly to avoid the drawbacks of the prior art and to present a connector pin, in particular a metal connector pin, for feedthroughs, in particular metal-sealing material feedthroughs, that avoids these drawbacks.

SUMMARY OF THE DISCLOSURE

In one embodiment, the present disclosure provides a connector pin for feedthroughs, comprising at least one first, elongated, cylindrical portion having a diameter D and at least one adjoining end portion. The end portion has a fillet and/or a fillet portion with a radius, and the fillet and/or the fillet portion has at least the form of a circular segment with radius R. The radius R is a radius according to a specification, and is obtained with a material-removing method and/or a non-material-removing method.

The present disclosure also provides a feedthrough comprising at least one of the connector pins of the preceding paragraph.

The present disclosure also provides a method for the production of a connector pin, for a feedthrough. The method comprises the steps of providing a connector pin blank made of a wire material with at least one end portion, and introducing a fillet and/or a fillet portion with radius R that is according to a specification, with a material-removing method and/or a non-material-removing method at the end portion of the wire material, resulting in a rounded end portion of the connector pin.

DETAILED DESCRIPTION OF THE PRESENT DISCLOSURE

Figure 1:
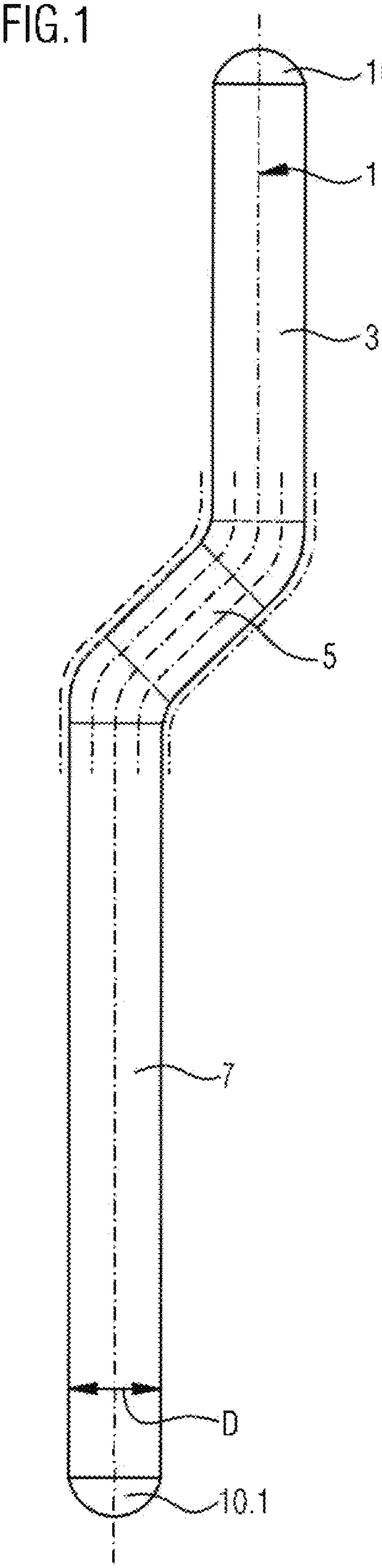
FIG. 1 shows a connector pin according to the disclosure.

In accordance with the present disclosure, the above-described goals accomplished by a connector pin, in particular a metal pin, for feedthroughs, in particular glass-metal feedthroughs, that has a first, elongated cylindrical portion with diameter D as well as at least one end portion that adjoins the first, elongated portion. The end portion has a fillet and/or a fillet portion with a radius and the fillet and/or the fillet portion has at least the form of a circular segment with radius R. The radius R is obtained in accordance with a specification, in particular a predetermined specification, by means of a material-removing method and/or a non-material-removal method without the use of vibratory grinding agents.

The avoidance of vibratory grinding particles ensures that defects in the surface of the connector pin are suppressed and/or are avoided. The advantage of surfaces without defects or largely free of defects is that no defects occur in coatings, such as, for example, nickel and/or gold coatings, that are applied to the pin. If the surface is largely free of defects, then it is easier to obtain a continuous surface coating.

A person skilled in the art would refrain from producing the fillet by use of a material-removing method and/or a non-material-removing method that did not involve the use of vibratory grinding agents, because a method of this kind is too complicated and time-consuming in comparison to the removal of material or the production of a fillet by the use of vibratory grinding agents.

It is especially preferred when the radius R of the fillet and/or of the fillet portion lies in the range of 0.4·D to 0.65·D, in particular 0.45·D to 0.55·D, and preferably lies at approximately half of the diameter D of the cylindrical portion. An especially good contact and a low contact resistance are then achieved.

In a further developed embodiment, the end portion has an end face, the surface of which is arranged essentially perpendicular to the pin axis and at which the fillet portion with radius R adjoins and forms the transition to the outer circumferential surface of the cylindrical portion.

It is especially preferred when the end face has a diameter F of less than 0.4 mm, in particular less than 0.3 mm, in particular for a diameter D of the cylindrical part of 1.0 mm±0.1 mm.

In a first embodiment of the disclosure, it is provided that non-material-removing methods, in particular reshaping methods, comprise for example, a swaging, a rolling, a stamping, a pressing, a hammering or, however, also compression.

In the case of material-removing methods, possible methods are lathing, milling, or grinding.

In an especially preferred embodiment, the connector pin has a pin surface. After the fillet has been introduced by a material-removing and/or non-material-removing method, the pin surface, which, is free or largely free of contaminants, in particular $Al_2O_3$ or SiC, is furnished with a coating, in particular a nickel coating. Free or largely free of contaminants is understood in the present application to mean that contamination, in particular contamination with a ceramic material such as $Al_2O_3$ or SiC, which can lead to defects in the coating, is present on less than 2%, preferably less than 1.5%, in particular less than 1%, preferably less than 0.5%, most preferred on less than 0.1%, of the entire pin surface. Based on the contamination that is absent in accordance with the disclosure, in particular the contamination with vibratory grinding particles that can be introduced into the pin, the coating applied to the pin surface is free or largely free of defects. Corresponding to the contaminants, this means that less than 2%, in particular less than 1.5%, preferably less than 1%, particularly preferred less than 0.5%, most preferred less than 0.1%, of the total pin surface has defects.

Vibratory grinding stones that have been used in the prior art for the processing of pin surfaces had a content of 45-65% aluminum oxide and 25-45% silicon oxide, leading to $Al_2O_3$ contaminants of 3.2% to 6.5% of the total pin surface. In the case according to the disclosure where a processing of the surface and thus the introduction of the fillet without vibratory grinding particles occurs only by a material-removing or non-material-removing method, the contamination of the total pin surface lies at less than 2%, more preferred at less than 1.5%, in particular less than 1%, preferably less than 0.5%, most preferred less than 0.1%.

The extensive absence of defects is advantageous, in particular when the layer thicknesses of the coatings applied to the metal pin are small. The layer thicknesses of the coatings applied to the metal pin lie between 0.1 μm to 10 μm. It is especially preferred when the layer thickness of the Ni layer applied to the metal pin lies in the range of 2 to 8 μm, preferably 4 to 6 μm. The layer thicknesses of the gold layer preferably lie in the range of 0.5 to 5 μm, preferably 0.8 to 1.5 μm. As total thickness of the coating composed of a Ni layer and a Au layer, values of between 4.5 μm to 7.5 μm preferably are obtained. In the case of such thin coatings, a surface that is largely free of defects, such as is made available by the disclosure, is essential for a coating in which defects are suppressed.

It is especially preferred when the fillet and/or the fillet portion with the radius R that is to be introduced into the end portion with the aid of the material-removing method or a non-material-removing method is predetermined, in particular, by a specification. Usually, the described connector pins are inserted in plug systems. In order to provide a transition resistance that is as small as possible, in particular in a plug system, and in order to ensure a secure contact, it is most especially preferred when the specification is such that the radius R corresponds to a hemisphere or to a hemispherical body in the end portion of the connector pin.

In another preferred embodiment, the end portion of the connector pin has a planar portion, which has a width situated, in particular, in the center of the pin axis and at which the fillet portion with the radius R adjoins. The planar portion is characterized essentially by a diameter F of its end face.

Preferably, R corresponds to roughly half of the diameter D of the cylindrical connector pin. It is especially preferred when the radius R lies in the range of 0.4·D≤R≤0.65·D, in particular in the range of 0.45·D≤R≤0.55·D. Especially preferred, a connector pin is designed such that, in the case of one pin with a diameter of 1 mm, the rounded region of the end portion opens 0.65 mm into the cylindrical portion with diameter D. In contrast to this, in the case of a connector pin that has been rounded by the use of vibratory grinding particles and has a diameter of 1 mm, the cylindrical part with the predetermined diameter D is reached only after more than 0.7 mm. The advantage of the fillet or of the introduction of the radius with a material-removing method or non-material-removing method in accordance with the disclosure is that the radii can be produced in accordance with a predetermined specification, which makes possible a shortened transition region to the cylindrical portion of the connector pin. This is possible because, by way of the material-removing method or non-material-removing method, the radius can be adjusted, which has not been possible in accordance with the prior art, because vibratory grinding cannot influence the shape of the fillet, in particular the radius. Thus, the profile of a smoothly ground pin always exhibits a drum-shaped course; that is, the transition from the radius to the cylindrical pin has a longer course, which extends beyond the radius. This can have drawbacks in terms of the reliability of the contacting of the connector pin, in particular when the latter is inserted into a plug system.

The form of the connector pin is a cylindrical shape with a diameter D of 1 mm, for example. At the end of the connector pin with the cylindrical shape, the connector pin transitions into a rounded region, which, in the ideal case, is a hemispherical cap with a radius R. Ideally, this radius R corresponds to half of the diameter of the cylindrical portion or lies in the range of $0.4 \cdot D \leq R \leq 0.65 \cdot D$, which, in accordance with the disclosure, can be achieved only with a material-removing or non-material-removing method—for example, by means of a deformation. In the case of a material-removing or non-material-removing method, the radii can be predetermined according to specification, this not being possible in the case of a fillet produced by the use of vibratory grinding particles.

Based on the fact that vibratory grinding particles are not worked into the surface of the connector pin, it is possible, after the production of the radius, to produce a continuous surface coating that is largely free of defects and, therefore, the risk of corrosion on the surface-coated pins is substantially diminished.

In addition to the connector pin according to the disclosure, in particular in the form of a metal pin, the disclosure also makes available a feedthrough, in particular a metal-sealing material feedthrough, preferably for devices that are subjected to high pressures, having at least one connector pin of this kind. Preferably, it is such that the feedthrough has an opening, through which the connector pin is inserted through a glass or glass-ceramic material.

In addition to the connector pin and the feedthrough, the disclosure also presents a method for the production of a connector pin of this kind, wherein, first of all, a connector pin blank is provided, which, for example, can be obtained from a wire material by cutting and which has an end portion. In the connector pin blank, a rounded region with a radius, preferably with a radius in accordance with a predetermined specification, is then introduced in the end portion by means of a material-removing and/or non-material-removing method. Preferably, the radius of the fillet or of the fillet portion lies in the range of $0.4 \cdot D \leq R \leq 0.65 \cdot D$, where D is the diameter of the cylindrical part. After the rounding or introduction of the radius in the pin with the help of the material-removing or non-material-removing method, it can be provided that the connector pin is furnished with a coating, preferably with a nickel coating and/or a gold coating.

The disclosure will be described below in detail on the basis of drawings, without any limitation thereto.

Referring to the drawings, FIG. 1 shows, by way of example, a connector pin according to the disclosure. In the embodiment illustrated in FIG. 1, the connector pin 1 comprises three portions: a first, essentially straight portion, which is indicated by the reference number 3; a bent portion, which is indicated by the reference number 5; and an end region or end portion, which is indicated by the reference number 7. The end portions 10.1, 10.2 of the pin 1 are rounded in accordance with the disclosure, namely, with the help of a non-material-removing and/or material-removing method, with the radius R of the fillet being predetermined. The radius R can be, for example, 0.5 m, the diameter D of the connector pin can be 1 mm. With the help of the material-removing and/or non-material-removing method, it is then possible to adjust the predetermined radius, which is preferably half of the diameter of the cylindrical part of the connector pin. The connector pins are obtained by cutting them from a section of wire. The non-straight, that is, bent portion 5 of the pin is inclined 45° with respect to the straight portion 3 and the end portion 7. The diameter D of the pin is between 0.5 to 2.5 mm, for example. It is also possible to use pins with a diameter smaller than 0.5 mm.

Figure 2:
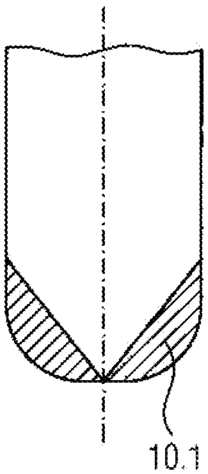
FIG. 2 shows an end portion of a connector pin according to the disclosure, with a fillet.

Illustrated in FIG. 2 is the end portion with a fillet. The fillet or the fillet portion, which, in the ideal case, is conical, but need not be conical, comprises a radius R. The radius lies in the range of 0.25 mm to 1.0 mm. The fillet portion has a side length that likewise lies in the range of the radius, that is, between 0.25 mm and 1.0 mm. For example, the height of the fillet to the transition into the cylindrical portion can amount to 0.5 mm. The diameter of the pin then lies, at the same time, at approximately 1.0 mm.

Once the fillet has been introduced by the use of a non-material-removing and/or material-removing method according to specification—that is, radii, diameter, height of the portion—in the at least one end portion with the predetermined fillet, the connector pin can be furnished with a coating on the pin surface. As a rule, a nickel layer is applied to the connector pin as protection against corrosion. Subsequently, a gold layer is applied to the nickel coating. The thickness of the nickel coating and the gold coating lies in the μm range, preferably in the range of 0.1 μm to 10 μm. Instead of a gold coating, it is also possible to apply a coating of palladium. The coating with nickel and gold provides a plug connection with a reliable contact and a low transition resistance. Because, with the material-removing and/or non-material-removing method in accordance with the disclosure for introduction of the radius, the pin surface is kept largely free of contaminants, such as, for example, vibratory grinding agents, the coating applied to the connector pin—for example, the nickel coating—has no defects and, as a result, the connector pin remains largely free of corrosion. Free or largely free of contaminants is understood in this application to mean that less than 2%, in particular less than 1.5%, preferably less than 1%, more preferably less than 0.5%, particularly preferred less than 0.1%, of the pin surface is contaminated with, for example, vibratory grinding particles. Undesired vibratory grinding particles are, in particular, particles of a ceramic material, such as, for example, $Al_2O_3$ or SiC. Less damaging in terms of defects and thus tolerable are particles of other materials, such as, for example, iron particles. Accordingly, this leads to a low contact transition resistance. In particular, by dispensing with vibratory grinding agents, defects are avoided, which, in turn, lead to corrosion and, on the basis of the corrosion, lead to an increase in the contact resistance and ultimately to a loss of current conduction over time.

Figure 3:
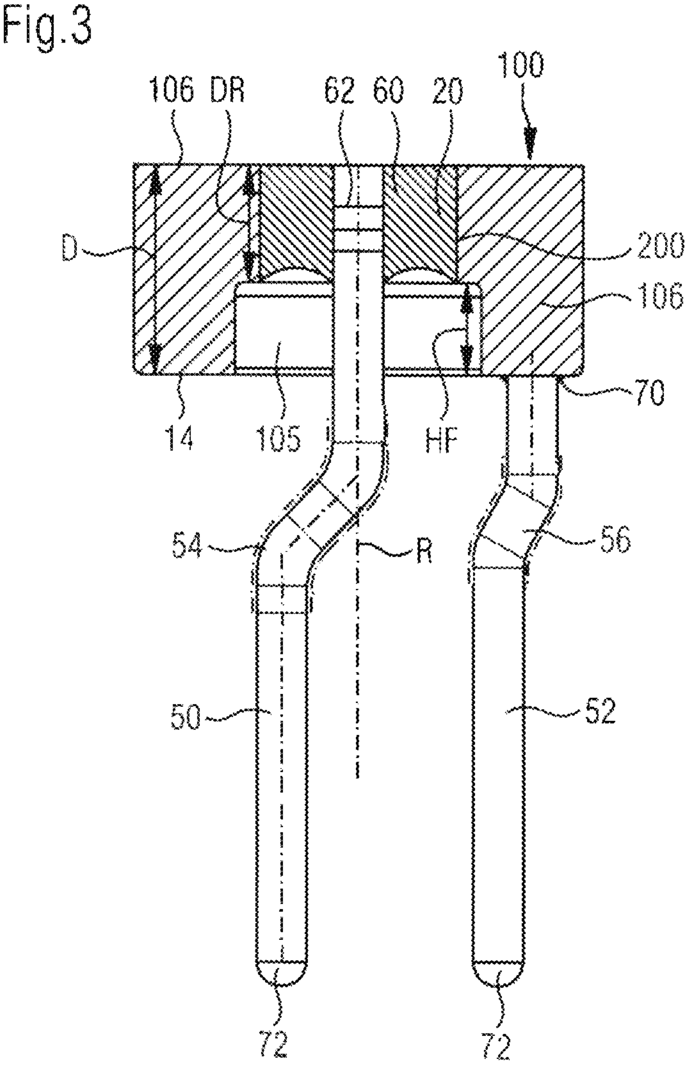
FIG. 3 shows an exemplary feedthrough with a connector pin.

Illustrated in FIG. 3 is the use of a connector pin according to the disclosure, in particular a metal pin, in a feedthrough. FIG. 3 shows a feedthrough 100, in particular a metal-sealing material feedthrough for devices that are subjected to high pressures.

Clearly seen is the feedthrough 100 that comprises a ring-shaped element 106 with an opening. Shown further is a clearance region 105. A feedthrough opening 20 with the thickness DR is punched out of the remaining material of the ring-shaped element 106 with the thickness DR and, in the present case, has a conical course 200. Whereas, in the exemplary embodiment shown, the conicity is introduced over the entire length of the feedthrough opening, it is possible in an alternative embodiment for the conicity to extend only over a part of the length of the feedthrough; that is, the feedthrough opening then has two portions, a conical portion and a non-conical adjoining portion. The conical portion can then be produced, for example, by reshaping or forming and the non-conical portion by punching.

The ring-shaped or plate-shaped element 106 serves as the basis for a metal-sealing material feedthrough with a total of two connector pins 50, 52 in accordance with the disclosure. Whereas the connector pin 50, which is preferably metal pin, is passed from the front side to the back side in a sealing material 60, which, in this case, is a glass material, but can also be a glass-ceramic material or a ceramic material, in an insulated manner with respect to the ring-shaped or plate-shaped base body 106, the second connector pin, in particular the second metal pin 52, serves as a grounding pin. To this end, the second metal pin 52 is joined directly to the ring-shaped or plate-shaped body 106. Both connector pins 50, 52 are bent in design. The bend in the metal pins 50, 52 is indicated by 54 and 56, respectively, and can be clearly seen.

In addition, the connector pin, in particular the first metal pin 50, can be furnished with means 62 on the first metal pin 50 itself that engage in the glass plug and thus prevent the metal pin from being pressed out of the glass plug 60 in which the metal pin is glazed, even at high pressures.

The glazing of the connector pin, in particular first metal pin 50, in the sealing material 60 occurs by fusion. Once the connector pin, in particular metal pin 50, has been fused in the sealing material 60, the glass plug together with the metal pin 50 is introduced into the feedthrough opening 20. Subsequently, the glass plug together with the ring-shaped or plate-shaped element, that is, the base body, is heated, so that, after cooling, the metal of the ring-shaped or plate-shaped element shrinks onto the sealing material, which, in this case, is the glass material, as already previously the case for the production of the glass plugs, during which the first connector pin, in particular first metal pin 50, is introduced into the glass plug. The second connector pin, in particular second metal pin 52, that serves as ground is joined to the plate-shaped element in a conductive manner by hard soldering, for example. The soldering point is indicated by 70. All related metal pins are rounded at the end portions 72 in accordance with the disclosure by a material-removing and/or non-material-removing method. In this way, there is no contamination of the surface of the connector pins, in particular metal pins, so that the connector pins can be furnished with a coating without any defects. The coated connector pins have a low contact resistance. Because defects are prevented, a subsequent coating with Ni or Au, for example, is possible, producing a continuous surface that is largely free of defects. The continuous surface, in turn, ensures that any corrosion can largely be ruled out.

Figure 4B:
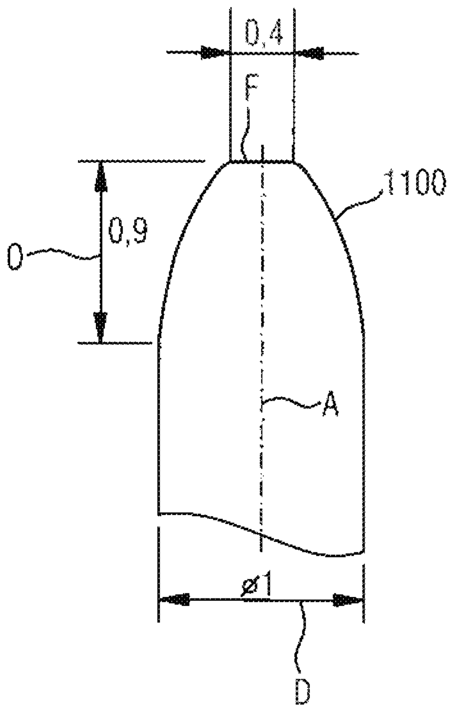
Fig.4b (Prior Art)
FIG. 4*b* shows an illustration of a connector pin cap produced using vibratory grinding particles, according to the prior art.
Figure 4A:
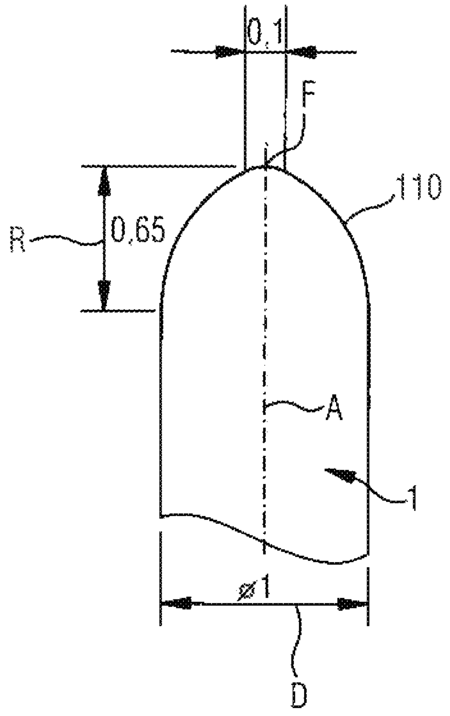
FIG. 4*a* shows an illustration of a connector pin cap in accordance with the present disclosure.

Illustrated in FIG. 4 are rounded pins that were produced using the method in accordance with the disclosure (FIG. 4*a*) and using vibratory grinding particles (FIG. 4*b*).

FIG. 4*a* shows a connector pin that has been produced in accordance with the disclosure according to a predetermined specification. The connector pin in accordance with FIG. 4*a* is a connector pin in which the cap 100 was produced by cold forming. The cap is one with an end face F, the surface of which is perpendicular to the pin axis A and at which a fillet portion with a radius of R=0.65 mm adjoins. The section of the fillet portion corresponds geometrically to a circular segment and the diameter D of the cylindrical part of the pin is 1 mm. In the exemplary embodiment shown, the diameter of the end face F is 0.1 mm. Ideally, the radius R would be identical to half of the diameter D of the cylindrical part of the pin 1, that is, 0.5 mm. The range $0.4 \cdot D \leq R \leq 0.65 \cdot D$ for the radius is to be regarded, however, as being in accordance with the disclosure. Another preferred embodiment specification corresponds to the formula $$R = D/2 - (\text{diameter of } F)/2,$$

where F is the diameter of the end face. If the diameter D of the cylindrical portion is 1 mm and the diameter F is 0.1 mm, as in FIG. 4*a*, then, in the illustrated example, R is thus preferably 0.45 mm. The disclosure makes it possible in an especially advantageous manner for the diameter of the end face F to be less than 0.4 mm, in particular less than 0.3 mm.

Whereas the cold-formed connector pin shows a fillet of the end portion with a predetermined radius R and a cap with fillet portions of circular segment shape, this is not accomplished in the case of a connector pin in which the fillet is produced by the use of vibratory grinding particles as illustrated in FIG. 4*b*. In the latter case, the fillet portion is, in particular, hyperbolic. The connecting portion of the pin is again indicated by the reference number 1100. The cylindrical part of the connector pin has a diameter of D=1 mm. As can be clearly seen in FIG. 4*b*, the course of the profile of the pin is drum-shaped; that is, the transition O from the connecting portion 1100 to the cylindrical part is, in contrast to 0.65 mm in accordance with FIG. 4*a*, 0.9 mm for a connector pin produced in such a way and is thus significantly longer in its course. A consequence thereof is that a much higher transition resistance exists than in the case of the embodiment according to FIG. 4*a*. It is likewise to be observed that the end face has a relatively large diameter. This results in a hard transition to the fillet portion, on which coatings poorly adhere or are easily scraped off.

Accordingly, with the disclosure, a connector pin that can be produced according to specification is provided, which, in particular, has no contamination of the surface and has a geometrically defined connection portion, in particular for insertion into a plug system. In this way, a low transition resistance and very good long-term contact properties are achieved.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

The invention claimed is:

1. A connector pin for a feedthrough, comprising:
- an elongated, cylindrical portion extending along a pin axis thereof and having a diameter D;
- an adjoining end portion that has a circular face F essentially perpendicular to the pin axis; and
- a fillet and/or a fillet portion with a radius R connecting the cylindrical portion to the circular face F about an entire circumference of the circular face F,
- wherein the circular face F has a flat surface with a diameter of less than 0.1 mm,
- wherein the radius R of the fillet and/or of the fillet portion is in a range of $0.4 \cdot D$ to $0.65 \cdot D$, and wherein the radius R is obtained with a material-removing method and/or a non-material-removing method.

2. The connector pin according to claim 1, wherein the non-material-removing method comprises a reshaping method.

3. The connector pin according to claim 1, wherein the material-removing method comprises a method selected from the group consisting of: lathing, milling, and grinding.

4. The connector pin according to claim 1, wherein the connector pin has a connector pin surface, and wherein the connector pin surface in the cylindrical portion, is free of $Al_2O_3$ and SiC.

5. The connector pin according to claim 1, wherein the connector pin has less than 2% of a total connector pin surface that has contaminants of $Al_2O_3$, SiC, or a combination thereof.

6. The connector pin according to claim 1, wherein the connector pin has a surface that comprises a coating.

7. The connector pin according to claim 6, wherein the coating has a nickel coating with a layer thickness in a range of 2 to 8 μm, and/or the coating has a gold coating with a layer thickness of the gold coating is in a range of 0.5 to 5 μm.

8. The connector pin according to claim 6, wherein the coating is largely free of defects.

9. The connector pin according to claim 1, wherein the radius R is from 0.25 mm to 1.0 mm, and/or the diameter D is from 0.5 mm to 2.0 mm.

10. The feedthrough comprising a connector pin according to claim 1.

11. The feedthrough according to claim 10, wherein the feedthrough comprises an opening, wherein the connector pin is passed through the opening in a glass or glass-ceramic material.

12. The connector pin according to claim 1, obtained by providing a connector pin blank made of a wire material; and introducing the fillet with the material-removing method and/or the non-material-removing method at the adjoining end portion.

13. The connector pin according to claim 12, further comprising the step of coating the connector pin with a coating.

14. The connector pin according to claim 1, wherein the connector pin is a metal pin.

15. The connector pin according to claim 1, wherein the radius R is in a range of $0.45 \cdot D$ to $0.55 \cdot D$.

16. The connector pin according to claim 12, wherein the connector pin is a metal pin.

17. A connector pin for a feedthrough, comprising:

an elongated, cylindrical portion extending along a pin axis thereof and having a diameter D;

an adjoining end portion that has a flat circular face F having a diameter d essentially perpendicular to the pin axis; and a fillet and/or a fillet portion that has a radius R connecting the cylindrical portion to the circular face F about an entire circumference of the circular face F, wherein $R=D/2-d/2$.

* * * * *